Patented Mar. 11, 1924.

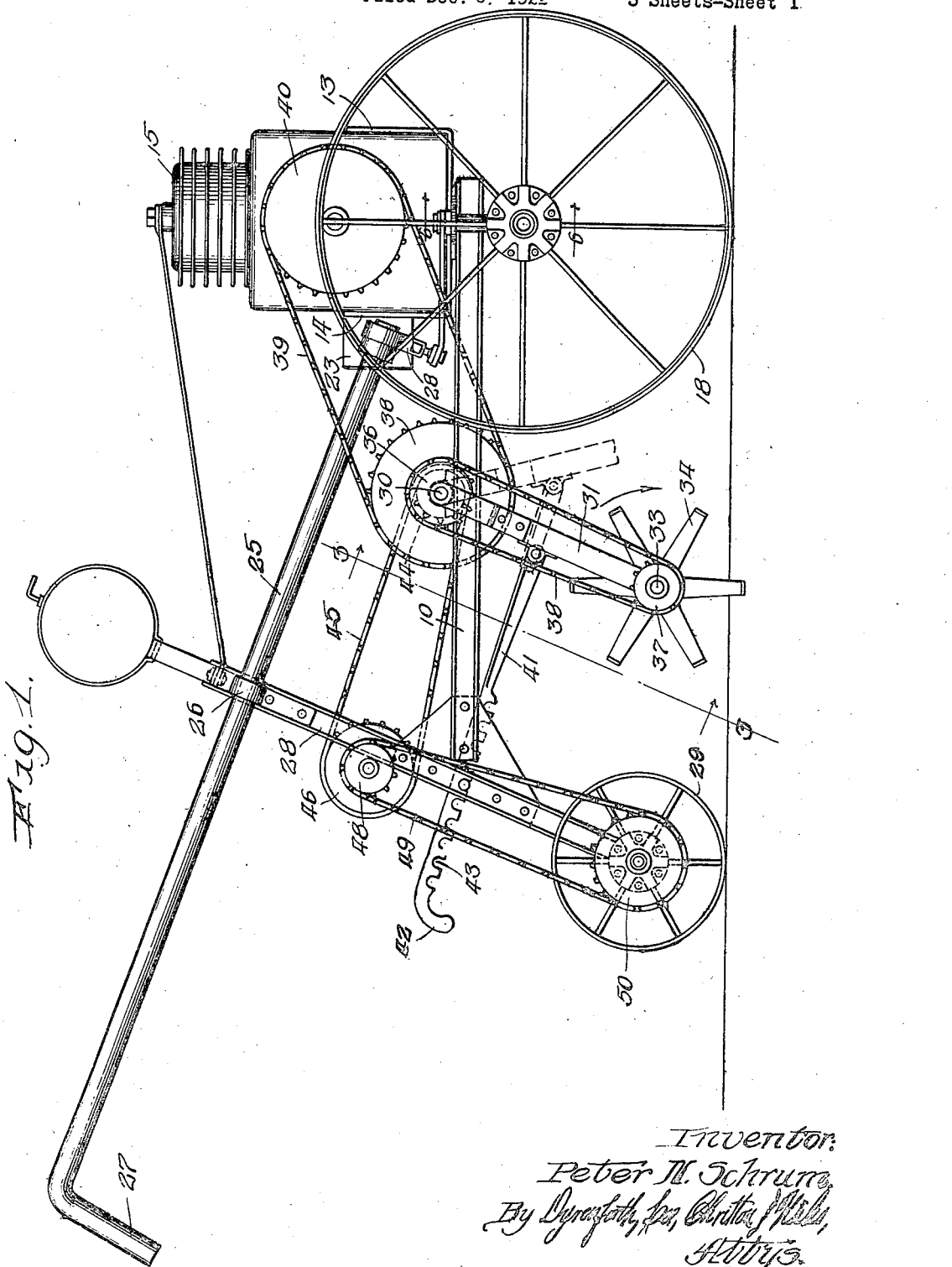

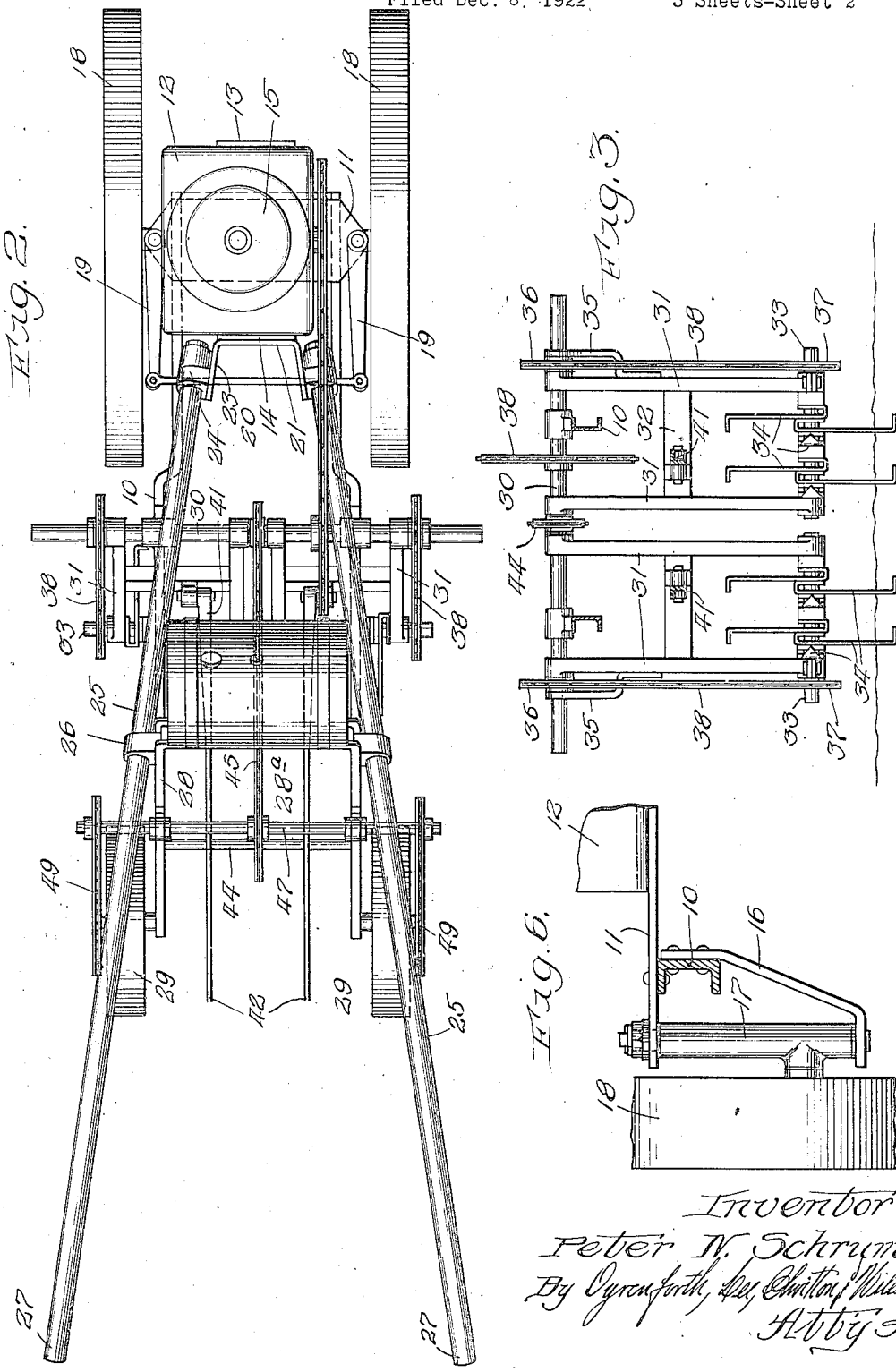

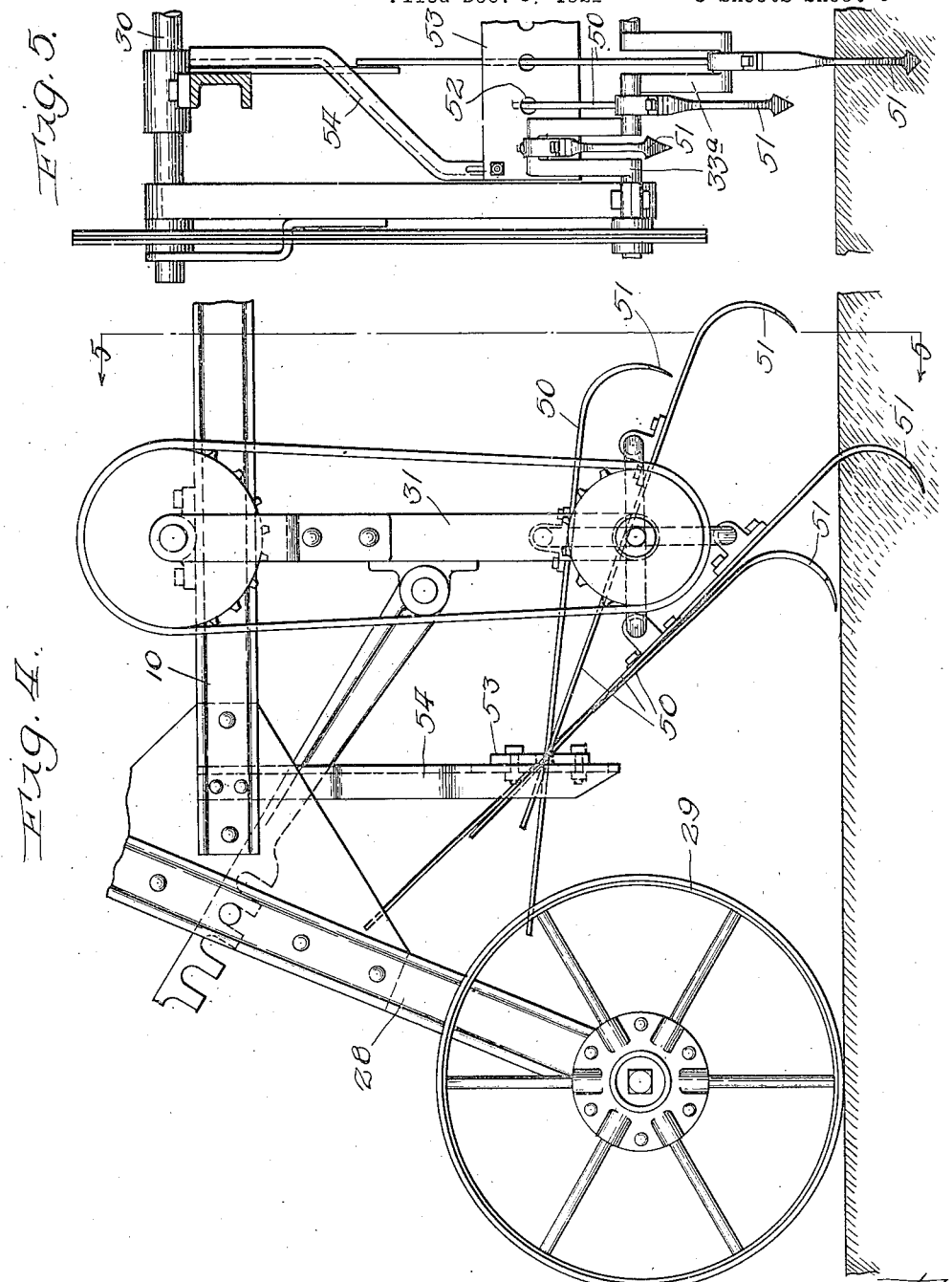

1,486,548

UNITED STATES PATENT OFFICE.

PETER N. SCHRUM, OF HAMMOND, INDIANA.

CULTIVATOR.

Application filed December 8, 1922. Serial No. 605,605.

*To all whom it may concern:*

Be it known that I, PETER N. SCHRUM, a citizen of the United States, residing at Hammond, in the county of Lake and State of Indiana, have invented a new and useful Improvement in Cultivators, of which the following is a specification.

This invention relates to improvements in cultivators. My improved cultivator is simple in construction and design, thus lowering the cost of production. It is also so designed that it can be easily operated and readily steered. Other features and advantages of my improved cultivator will appear more fully as I proceed with my specification.

A device embodying the features of my invention is shown in the accompanying drawings, in which Figure 1 is a view in side elevation, Fig. 2 is a top plan view, Fig. 3 is a view taken as indicated by the line 3 of Fig. 1, Fig. 4 is a fragmentary view similar to Fig. 1, showing a modified form of device, Fig. 5 is a view taken as indicated by the line 5 of Fig. 4, and Fig. 6 is a view taken as indicated by the line 6 of Fig. 1.

As shown in the drawings, 10 indicates a pair of longitudinally arranged parallel frame members made preferably of channel iron, as shown. Each of these members 10 is provided with a slight offset, as shown. The frame members 10 are joined at their forward ends on top by a cross member 11 in the form of a rectangular plate, having pointed ends. Mounted on the cross member 11 is a substantially square-shaped engine-supporting plate 12 having upwardly turned parts 13 and 14 at its forward and rear sides respectively. The plate 12 carries a motor 15, of any suitable sort, here shown as an internal combustion engine of the air-cooled type.

Near their forward ends, the frame members 10 also carry downwardly and outwardly projecting brackets 16 (see Fig. 6). Pivotally mounted, in the usual manner, between the pointed ends of the plate 11 and the ends of the brackets 16 are steering knuckles 17, which in turn carry the main supporting wheels 18. Attached to the steering knuckles 17, in the usual manner, are rearwardly projecting steering arms 19, which are joined by a connecting rod 20. The part 14 carries a plate 21 having two rearwardly extending wings 23, to which are attached loops 24 having pivotally mounted therein the forward ends of tubular steering handles 25. The handles 25 are also pivotally supported in the bearing members 26, and their rear ends are turned downwardly to form hand-grips 27. The forward ends of the handles 25 carry downwardly projecting arms 28, which are joined to the connecting rod 20, so that rotation of the handles 25 will cause movement of the connecting rod 20 and consequent movement of the steering knuckles 17 to steer the machine. It is to be noted that the machine also may be steered by merely raising the wheels 29 and swinging the machine about on the wheels 18.

The frame members 10 carry at their rear ends substantially vertically arranged members 28 joined at their upper ends by the horizontal member 28ª and carrying at the lower ends the rear supporting and driving wheels 29. It will be noted that the frame members 10, thus joined at their forward ends and rear ends, form a more or less rigid frame. The upper ends of the members 16 carry the bearing members 26 which support the handles 25.

About midway between their ends, the frame members 10 carry a counter-shaft 30. Rotatably mounted on the counter-shaft 30 are two substantially H-shaped members (see Fig. 3), each comprising the two vertical pieces 31 joined by the horizontal member 32. The upper ends of members 31 are rotatably mounted on the counter-shaft 30. The lower ends of the members 31 carry rotatably mounted therein a shaft 33 on which is mounted, in any suitable manner, the colters or cultivating tools 34. For example, the shaft 33 may be squared and the tools 34 slipped on when the shaft is removed from the H frame. The tools 34 may be of any shape desired and are detachable so that they may be readily taken off, put on or exchanged. Each of the outer members 31 carries an offset arm 35 through the upper end of which extends the counter-shaft 30. Mounted on the counter-shaft 30, between the arm 35 and the upper end of the member 31, is a sprocket 36. The outer ends of the shafts 33 also carry sprockets 37. The sprockets 36 and 37 are connected by a chain 38, so that rotation of the counter-shaft will drive the shafts 33 and the cultivator tools 34. It is to be noted that the H frame may be moved transversely of the machine by slipping the same on the counter-shaft 30. This is accomplished by loosening the set screw or other device holding the sprocket 36 and moving this sprocket which thereby moves the corresponding H frame. The counter-shaft 30 is driven by a sprocket 38 connected by a chain 39 to the engine sprocket 40. It is to be noted that swinging of the H frame on the counter-shaft 30 will operate to swing the shaft 33 about the counter-shaft 30 as a center. This obviously will operate to raise and lower the cultivator tools 34. By this swinging, also, the cultivator tools may be moved from the position as shown by the solid lines in Fig. 1 to a position as indicated by the broken lines in Fig. 1. Also, they may be swung upwardly, in a forward direction or in a backward direction beyond these positions in order to raise them higher. Each of the H frames is adapted for separate adjustment in this manner. Pivotally attached to each of the cross members 32 is a rearwardly extending arm 41 provided with a handle at the rear end 42. The arm 41 on its underside is provided with a series of notches 43 adapted to engage with the cross bar 44 arranged between the two vertical members 28. By this mechanism, either of the two H frames may be independently adjusted to give the desired position of the cultivator tools with respect to the ground.

The counter-shaft 30 is also provided near its center with a sprocket 44, which drives a chain 45 mounted on a sprocket 46, which drives a transverse shaft 47 supported on the members 28. The shaft 47 is provided at its ends with sprockets 48, which drive chains 49 engaging with sprockets 50 on the rear driving and supporting wheels 29. It will be seen, therefore, that the wheels 29 will act to propel the machine forward. In this connection, it is to be noted that rotation of the cultivator tools 34 is also in such a direction (as indicated by the arrow in Fig. 1) that their rotation will also assist in propelling the cultivator forward. In Fig. 4, I have shown a modified form of device. In this form of device the shafts 33 are removed from the H frames and there are substituted in their place two crank shafts 33ª. Mounted on each of the crank arms of the crank shafts 33ª is a bar 50, the forward end of which is curved downwardly and provided with a point 51 adapted to operate as a cultivating tool. The particular curvature and shape of the forward ends of the bars 50 may be as desired in order to provide the desired kind of cultivator tool. The rear ends of the bars 50 project through holes 52 in a plate 53 arranged transversely of the machine and supported by two depending arms 54 attached to the rear ends of the frame members 10. It will be seen that with this mechanism rotation of the crank shaft 33ª will cause the tools 51 to claw or hook into the ground and pull the machine forward and also cultivate the ground. If desired, the wheels 29 may also be driven in the same manner as shown in the preferred form. In Figs. 4 and 5, however, I have not shown such driving mechanism, as it is fully illustrated in the other views.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. A cultivator, including a main frame, supporting wheels carried by the main frame, a motor mounted on the main frame, a counter-shaft mounted on the main frame, a depending tool frame rotatably mounted on the counter-shaft, a shaft rotatably mounted in the depending tool frame, cultivator tools mounted on said last-mentioned shaft, and means for driving said shaft from said motor.

2. A cultivator, including a frame, supporting wheels carried by the frame, a motor mounted on the frame, a counter-shaft mounted on the frame, a depending swinging member carried by the counter-shaft, a shaft rotatably mounted at the lower end of the swinging member, cultivator tools on said shaft, and means for driving said shaft from said motor.

3. A cultivator, including a frame, supporting wheels carried by the frame, a motor mounted on the frame, a counter-shaft mounted on the frame, swinging depending members carried by the frame, a shaft rotatably mounted on the lower end of each of said swinging members, cultivator tools mounted on said shafts, and means for driving said shafts from said motor.

4. A cultivator, including a frame, supporting wheels carried by the frame, a motor mounted on the frame, a counter-shaft mounted on the frame, a depending swinging member carried by the counter-shaft, means for adjustably retaining said swinging member in position, a shaft rotatably mounted on the lower end of said swinging member, cultivator tools on said shaft, and means for driving said shaft from said motor.

5. A cultivator, including a frame, supporting wheels carried by the frame, a motor mounted on the frame, a counter-shaft mounted on the frame, a depending swinging member carried by the counter-shaft, means for adjustably retaining said swinging member in position, cultivator tools mounted on the lower end of said swinging member, and means for driving said cultivator tools from said motor.

6. A cultivator, including a frame, main supporting wheels carried by the forward end of the frame, auxiliary supporting and driving wheels carried by the rear end of the frame, a motor mounted on the frame, a depending swinging member carried by the frame, cultivator tools mounted on the lower end of the swinging member, and means for driving the cultivator tools and the rear auxiliary supporting and driving wheels from said motor.

7. A cultivator, including a frame, main supporting wheels carried by the forward end of the frame, auxiliary supporting and driving wheels carried by the rear end of the frame, a motor mounted on the frame, a counter-shaft mounted on the frame, a depending swinging member carried by the counter-shaft, a shaft rotatably mounted at the lower end of the swinging member, cultivator tools on said last mentioned shaft, and means for driving said shaft from said motor.

8. A cultivator, including a frame, main supporting wheels carried by the forward end of the frame, auxiliary supporting and driving wheels carried by the rear end of the frame, a counter-shaft mounted on the frame, a depending swinging member carried by the counter-shaft, cultivator tools mounted on the lower end of the swinging member, and means for varying the angularity between said swinging member and said frame.

Witness my hand and seal this 6th day of December, 1922.

PETER N. SCHRUM. [L. S.]